(12) United States Patent
Kim et al.

(10) Patent No.: US 7,656,757 B2
(45) Date of Patent: Feb. 2, 2010

(54) OPTICAL PICKUP FOR AN OPTICAL RECORDING AND/OR REPRODUCING APPARATUS INCLUDING AN ACTUATOR FORMING A PREDETERMINED ANGEL WITH RESPECT TO THE PICKUP BASE

(75) Inventors: Seok-jung Kim, Suwon-si (KR); Jung-gug Pae, Suwon-si (KR); Soo-han Park, Yongin-si (KR); Moon-whan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 11/368,612

(22) Filed: Mar. 7, 2006

(65) Prior Publication Data

US 2006/0203691 A1    Sep. 14, 2006

(30) Foreign Application Priority Data

Mar. 11, 2005    (KR)    ...................... 10-2005-0020545

(51) Int. Cl.
*G11B 7/00*    (2006.01)
(52) U.S. Cl. ................................. 369/44.15; 369/44.22
(58) Field of Classification Search ........................ None
See application file for complete search history.

(56) References Cited

U.S. PATENT DOCUMENTS

| 6,304,526 | B1 | 10/2001 | Nagashima et al. |
| 2003/0103441 | A1 | 6/2003 | Kim et al. |
| 2004/0120229 | A1 | 6/2004 | Pae et al. |
| 2005/0265141 | A1 | 12/2005 | Pae et al. |

FOREIGN PATENT DOCUMENTS

| CN | 1423257 | | 6/2003 |
| CN | 1499501 | | 5/2004 |
| EP | 1316949 | A | 6/2003 |
| JP | 9-297927 | | 11/1997 |
| JP | 11-66583 | | 3/1999 |
| JP | 2001-14696 | | 1/2001 |
| JP | 2002-197700 | | 7/2002 |
| JP | 2003-228864 | | 8/2003 |
| JP | 2004-103086 | | 4/2004 |

(Continued)

OTHER PUBLICATIONS

European Search Report issued in European Application No. 06110789.2 on Aug. 28, 2006.

(Continued)

*Primary Examiner*—Paul Huber
(74) *Attorney, Agent, or Firm*—Stein McEwen, LLP

(57) ABSTRACT

An optical pickup of an optical recording and reproducing apparatus includes a plurality of object lenses used to record and or reproduce information from/to various types of optical recording media of different recording densities; an actuator driving the object lenses in a focusing direction and supporting the object lenses to have rolling during movement in the focusing direction; and a pickup base installed to movably go and return in a radial direction of an optical recording medium, and the actuator forming a predetermined angle with respect to the pickup base.

18 Claims, 8 Drawing Sheets

FOREIGN PATENT DOCUMENTS

| | | |
|---|---|---|
| KR | 2003-69459 | 8/2003 |
| KR | 2004-18833 | 3/2004 |
| KR | 2004-21324 | 3/2004 |
| KR | 2004-38118 | 5/2004 |

OTHER PUBLICATIONS

Office Action issued on May 25, 2007 by the Chinese Intellectual Property Office for Chinese Patent Application No. 200610059496.5.

OPTICAL PICKUP FOR AN OPTICAL RECORDING AND/OR REPRODUCING APPARATUS INCLUDING AN ACTUATOR FORMING A PREDETERMINED ANGEL WITH RESPECT TO THE PICKUP BASE

CROSS-REFERENCE TO RELATED APPLICATION

This application claims the benefit of Korean Patent Application No. 2005-20545, filed Mar. 11, 2005 in the Korean Intellectual Property Office, the disclosure of which is incorporated herein by reference.

BACKGROUND OF THE INVENTION

1. Field of the Invention

An aspect of the present invention relates to an optical pickup for an optical recording and/or reproducing apparatus used for recording and/or reproducing information to/from an optical recording medium.

More particularly, an aspect of the present invention relates to an optical pickup for an optical recording and/or reproducing apparatus capable of recording and/or reproducing information from/to various types of optical recording media of different densities, and improving capability to cope with an optical recording medium, which is tilted.

2. Description of the Related Art

An optical pickup of an optical recording and/or reproducing apparatus capable of recording information on an optical disc, which is an optical recording medium, includes an optical pickup for moving along a direction of a radius of the disc, to irradiate light on a recording surface of the disc and receive the light reflected therefrom. The optical pickup has an actuator to help an object lens maintain a predetermined position and posture with respect to the recording surface of the disc.

FIG. 1 illustrates an optical pickup actuator disclosed in Korean Patent Publication No. 2003-69459. Referring FIG. 1, the optical pickup actuator includes a holder 11 fixed at a base 10, a blade 13 holding the object lens 12, a plurality of elastic supports 14a, 14b, and a magnetic driving portion for moving the blade 13 in a focusing (F) or tracking direction (T).

The magnetic driving portion has a pair of magnets 15 disposed around the blade 13, an inner yoke 16 and an outer yoke 17 both installed at the base 10, and a focusing coil 18 and a tracking coil 19 both wrapped on the blade 13.

The elastic support 14a is located along an inner circumference with respect to a radial direction of a disc (D) and the elastic support 14b in located along an outer circumference with respect to a radial direction of the disc (D). The outer elastic support 14b is longer, and has relatively less rigidity than the inner elastic support 14a.

In the above structured actuator, in order to trace a focusing position by a deflection of the disc upon optical recording and/or reproducing, rolling is performed in a focusing direction of the blade 13. The support 14b has less rigidity and more flexibility than the support 14a, accordingly permitting more rolling inside than outside.

As illustrated in FIG. 2A, in a case that the disc (D) is tilted upward from an outer circumferential direction, the blade ascends and rolling is performed in a (+) direction. Accordingly, the object lens 12 performs focusing on the recording surface of the disc, by tracing the tilted disc in a focusing direction.

As illustrated in FIG. 2B, in a case that the disc (D) is tilted downward from an outer circumferential direction, the blade descends and rolling is performed in a (−) direction. Accordingly, when recording and/or reproducing information on the disc (D) tilted downward, the blade 13 descends and performs rolling in a (−) direction, to change postures, such that focusing is exactly performed on the recording surface of the disc (D).

In order to cope with a tilted disc, a gradient changes according to positional changes of the blade 13 in a focusing direction. This gradient change is achieved using the elastic displacement differences of the outer and inner elastic supports 14a, 14b.

There are many different optical discs on the market including CD (Compact Disk), DVD (Digital Versatile Disk), BD-DVD (High-Definition DVD), and BD (Blue Laser Disk). Accordingly, there are active developments for an optical pickup capable of being used with various types of optical discs having different recording densities. In such a compatible optical pickup, more than one object lens can be employed and the employed object lens varies a focusing distance, that is, a WD (Working Distance) varies between optical discs having different recording densities.

As mentioned above, each of the optical discs has a different WD (Working Distance), and therefore, the blade is controlled to be driven in a focusing direction, to maintain a WD (Working Distance) with any optical disc employed.

As illustrated in FIGS. 1 or 2B, if the blade 13 is structured to have rolling in order to cope with the tilted disc, regardless of a deflection degree of the disc, a focusing error may occur.

SUMMARY OF THE INVENTION

According to an aspect of the present invention, there is provided an optical pickup for an optical recording and/or reproducing apparatus, the optical pickup including: a plurality of object lenses used to record and/or reproduce information to/from various types of optical recording media of different recording densities; an actuator driving the object lenses in a focusing direction and supporting the object lenses to have rolling during movement in the focusing direction; and a pickup base installed to movably go and return in a radial direction of an optical recording medium, the actuator forming a predetermined angle with respect to the pickup base.

According to another aspect of the present invention, it is desired that a distance between the optical recording medium and the plurality of object lenses be longer than a distance between the optical recording medium and a focusing-on position with respect to the optical recording medium.

According to another aspect of the present invention, the plurality of object lenses are disposed in equal distance intervals, within a predetermined error range of the moving distance from an initial position to the focusing-on position.

According to another aspect of the present invention, the error range is within ±0.2 mm.

According to another aspect of the present invention, the actuator is installed to be further from an outer circumference of the optical recording medium rather than from an inner circumference of the optical recording medium.

According to another aspect of the present invention, the object lenses are disposed in a manner that a rolling degree of the object lenses reaches zero when one of the plurality of object lenses is moved to a focusing-on position with respect to an optical recording medium corresponding to the object lens.

According to another aspect of the present invention, the various types of optical recording media include a first optical recording medium, a second optical recording medium having less recording density than the first optical recording medium, and a third optical recording medium having less recording density than the second optical recording medium.

According to another aspect of the present invention, the plurality of object lenses include a first object lens corresponding to the first optical recording medium and a second object lens corresponding to the second and the third optical recording media.

According to another aspect of the present invention, the first object lens is disposed closer to the outer circumference with respect to the optical recording medium than the second object lens.

According to another aspect of the present invention, the first recording medium is an optical recording medium of a BD type.

According to another aspect of the present invention, the second recording medium is an optical recording medium of an HD-DVD type.

According to another aspect of the present invention, a difference in height between the first and the second object lenses ranges from 0.3 mm to 0.5 mm.

According to another aspect of the present invention, the third recording medium is an optical recording medium of a DVD type.

According to another aspect of the present invention, the second recording medium is an optical recording medium of a DVD type and the third recording medium is an optical recording medium of a CD type.

According to another aspect of the present invention, the actuator includes a blade for supporting the plurality of object lenses; a base frame supporting the pickup base; supports located on an inner and outer sides of the blade in a radial direction of the optical recording medium, and the supports having different rigidities between them; and a magnetic driving portion for driving the blade in a focusing direction and/or track direction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
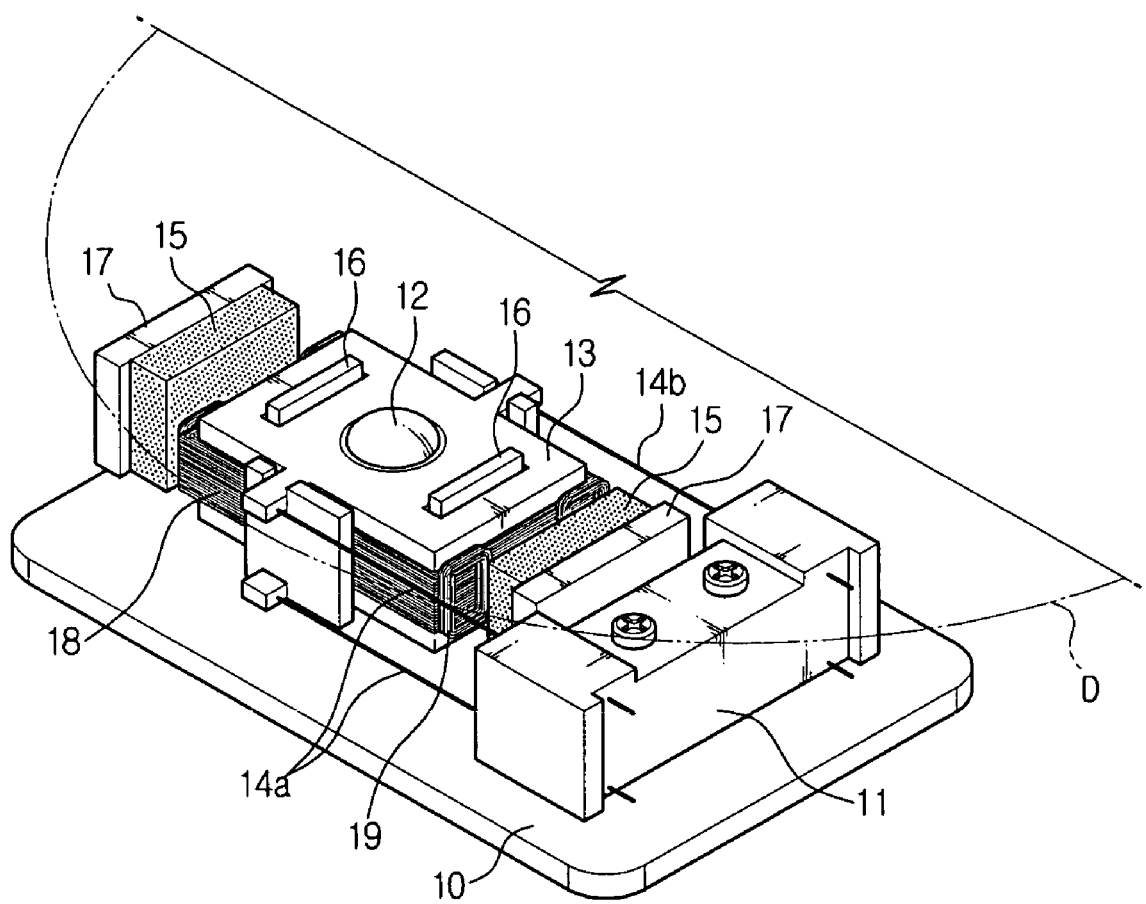
FIG. 1 is a schematic perspective view of a conventional actuator for an optical pickup.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
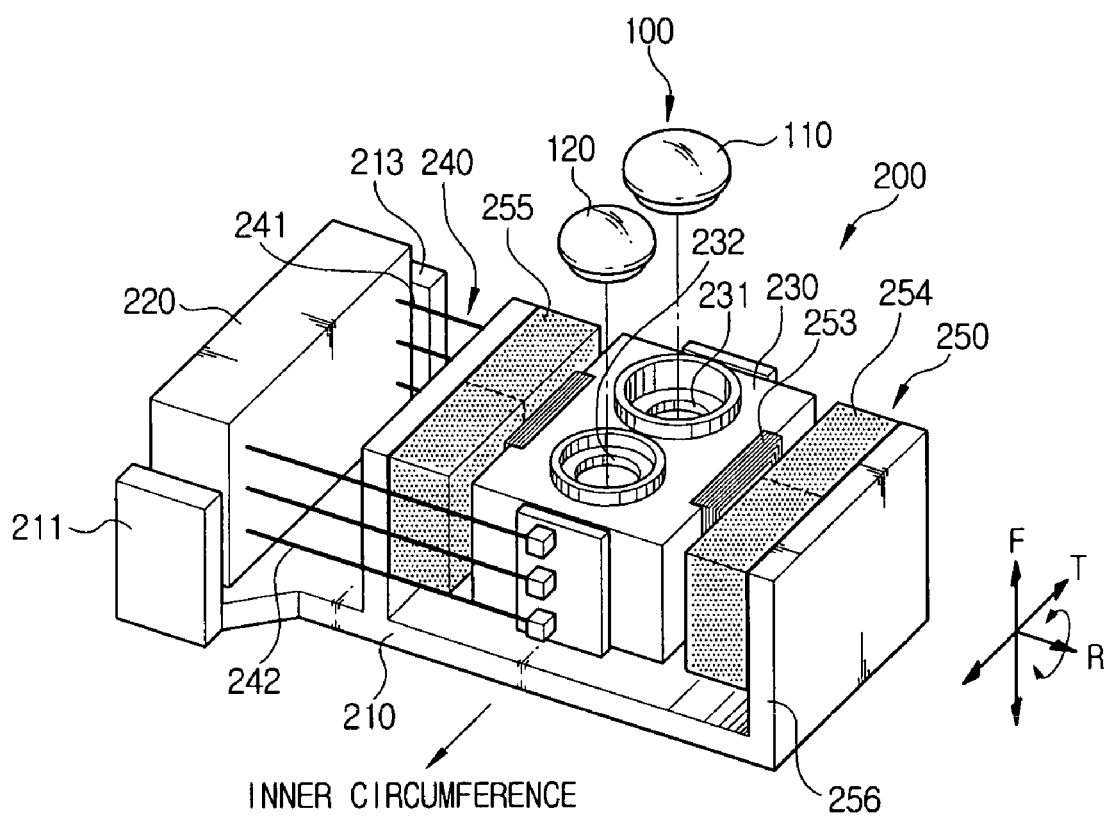
FIG. 3 shows a perspective view of an optical pickup actuator of an optical recording and or reproducing apparatus according to an embodiment of the present invention.
Figure 4:
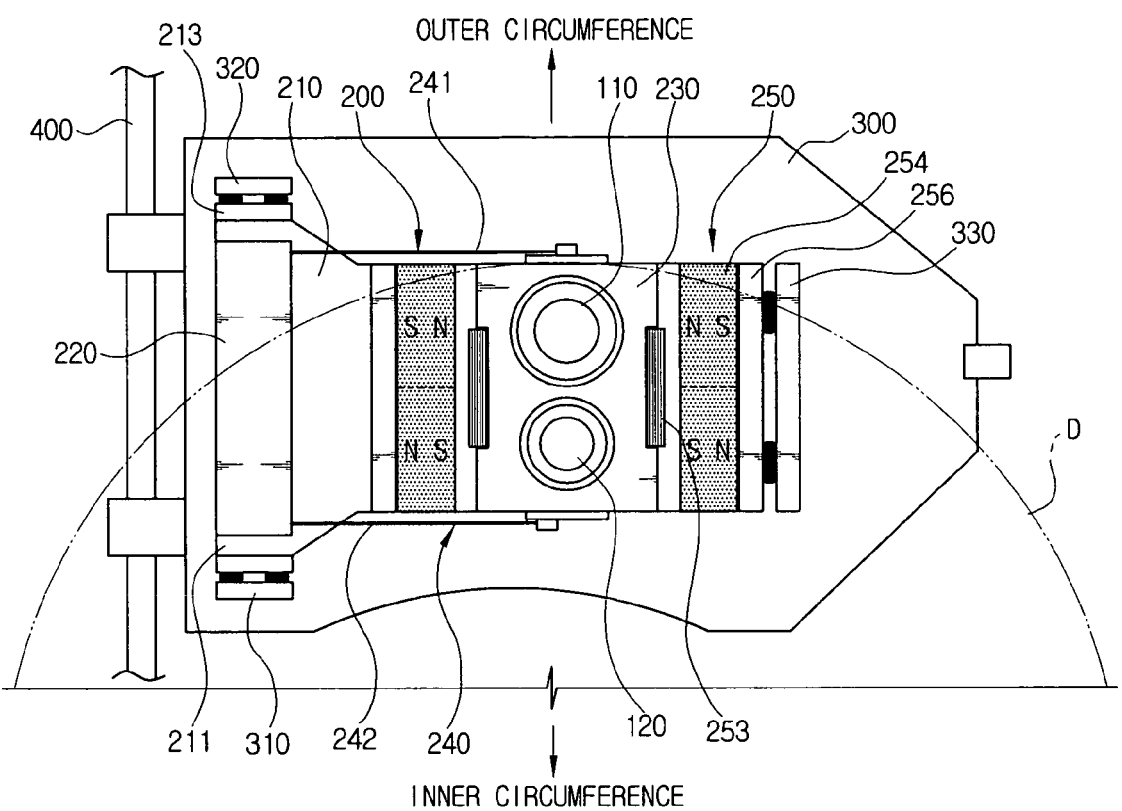
FIG. 4 shows a plan view of an optical pickup of an optical recording and or reproducing apparatus according to an embodiment of the present invention.
Figure 5:
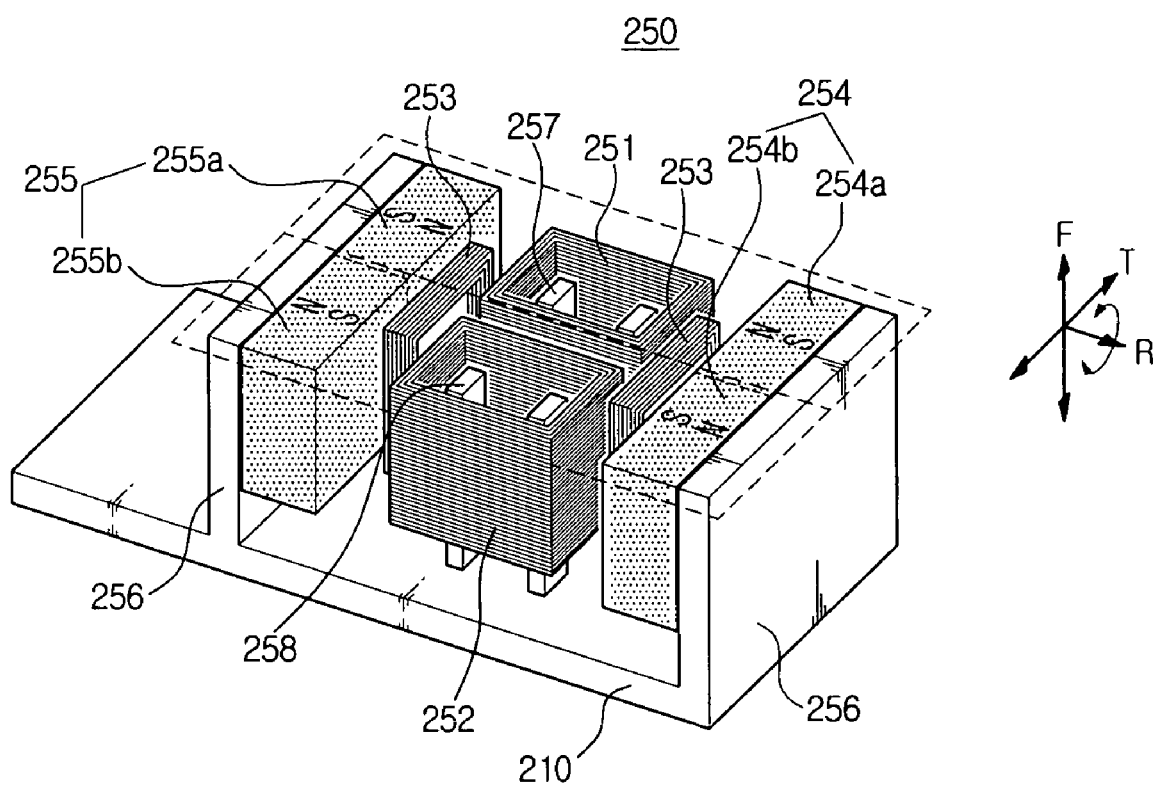
FIG. 5 is a view provided to explain a magnetic driving portion of the optical pick up of FIG. 3.

Referring to FIGS. 3 and 4, an optical pickup for an optical recording and/or reproducing apparatus according to an embodiment of the present invention, includes a plurality of object lenses 100, an actuator 200 and a pick-up base 300.

The plurality of object lenses 100 include a first and a second object lenses 110,120 having different NA (Numerical Aperture), enabling recording and/or reproducing information from a variety of optical recording media of different recording densities. That is, the first object lens 100 is used for recording and/or reproducing information from a high density optical recording medium and the second object lens 120 is employed to record and/or reproduce information from a low density optical recording medium.

Examples of the high density optical recording medium using the first object lens 110 include an optical disc (hereinafter, referred as BD) of the BD (Blue laser disc) type using short wavelength of light in the blue color group. A low density optical recording medium using the second object lens 120 includes an optical disc (hereinafter, referred as DVD) of the DVD (Digital Versatile Disk) type, an optical disc (hereinafter, referred as HD-DVD) of the HD-DVD (High-Definition DVD) type, having higher density than the DVD, and an optical disc (hereinafter, referred as CD) of the CD (Computer Disk) type, which has lower density than the DVD.

Accordingly, the first object lens 110 has a bigger NA than the second object lens 120. The first object lens 110 has a shorter WD (Working Distance) than the second object lens 120, in order to converge light in a shorter wavelength area than the second object lens 120 at the optical recording medium. The WD is a distance needed to allow an optical spot to be formed at the optical recording medium using the optical lenses 110, 120.

The optical lens 110 is disposed at an inner circumference of a disc (D), the second object lens 120 is disposed at an outer circumference of the disc (d). In consideration of the different WDs, the object lenses 110 and 120 are installed differently in height, as illustrated FIG. 6.

The actuator 200 includes a base 210, a holder 220 fixed at one side of the base 210, a blade 230 mounting the object lenses 110, 120, a plurality of supports 240 allowing movement of the blade 230 with respect to the holder 220, and a magnetic driving portion 250 moving the blade 230 in a focusing (F) and a tracking (T) direction.

The base 210 is formed of a metallic material. The base may include combination portions 211, 213 for attaching to the pickup base 300 using soldering at a predetermined part. The combination portions 211, 213 protrude from the base 210 and are formed to a predetermined height.

The holder 220 protrudes at one side of the base 210. A servo circuit for servo control of the magnetic driving portion 250 may be supported on the holder 220. The holder 220 may be formed with the base 210 in a single body.

Figure 6:
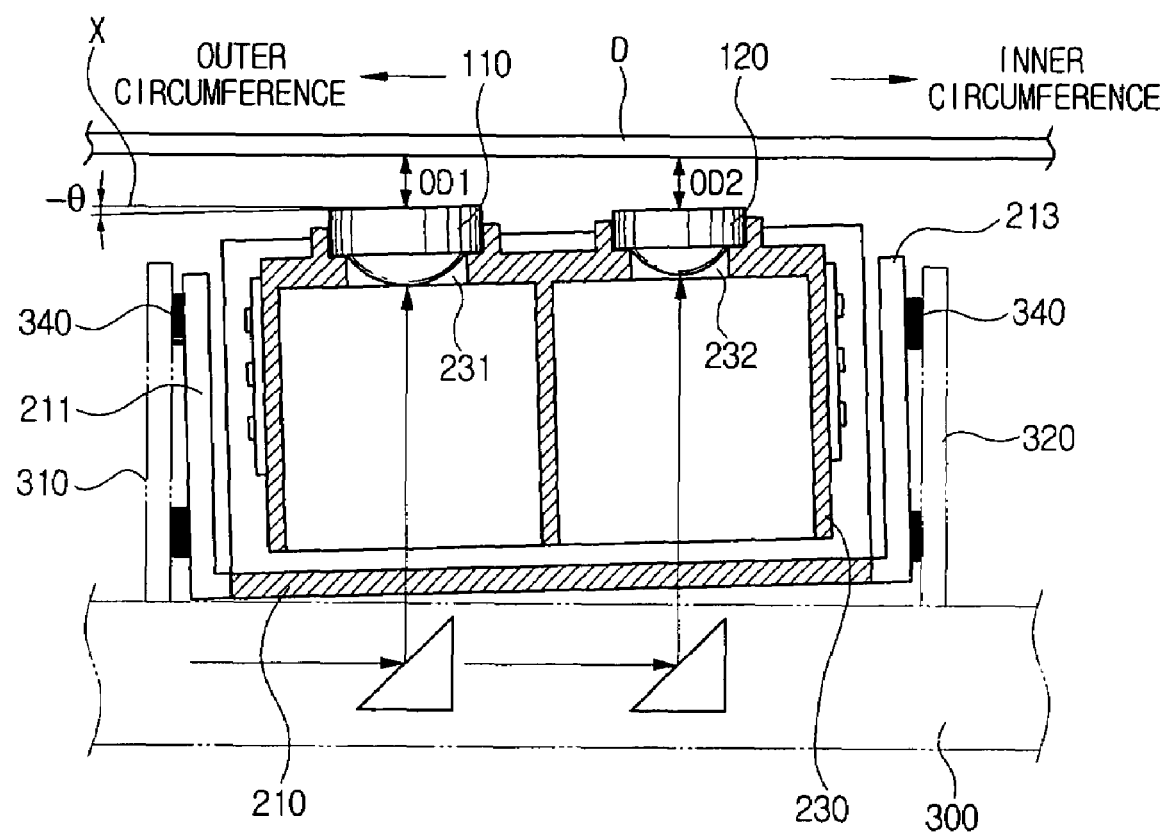
FIG. 6 is a sectional view of V-V line of FIG. 4.

The blade 230 supports the object lenses 110, 120. Supported by the actuator 200, the blade 230 is disposed at the upper part of the base 210. The blade 230, as illustrated in FIG. 6, is empty inside and is provided with the first and second lens mounting holes 231, 232 for mounting the first and the second object lenses 110, 120 at the upper part.

The first and second lens mounting holes 231, 232 are disposed next to each other in a T direction. Respective first and second lens mounting holes 231, 232 are prepared to install the object lenses 110, 120 at different heights. The inside of the blade 230 may be classified into 2 separate spaces and focusing coils 251, 252, which will be described later, are respectively installed at each space.

The plurality of supports 240 are placed along an outer side of the blade 230 and with respect to a radial direction of the optical disc (D) and the supports 242 are placed along an inner side of the blade 230. These supports 241, 242 are transformed or restored. A predetermined thick metal wire is an appropriate material for the supports.

Figure 2A:
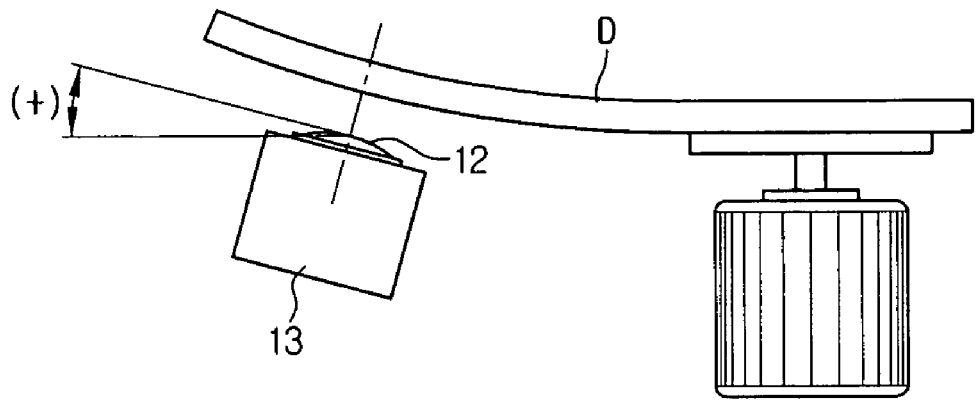
FIGS. 2A and 2B are views provided to explain an influence of rolling in a radius direction of the optical disc of a blade in focusing operation.
Figure 2B:
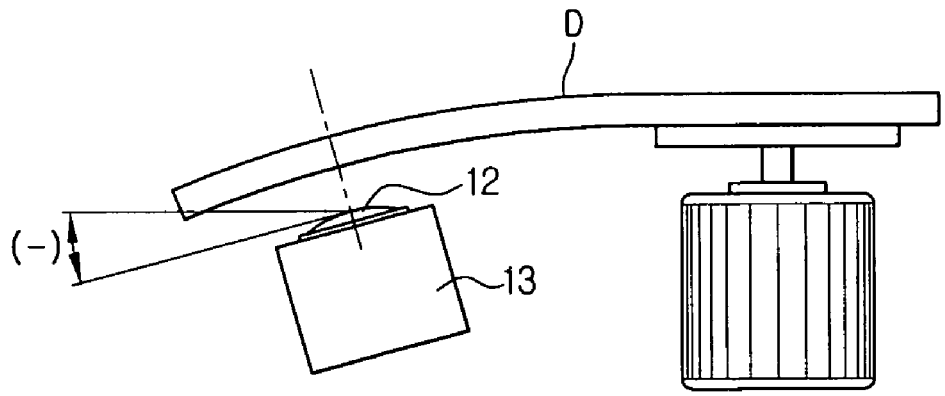

There can be any number of supports 241, 242, for example, 2 or 3. The support 241 located on an outer circumference of the blade 230 has relatively less rigidity than the support 242 located on an inner circumference of the blade 230. Therefore, there is one requirement, which is that the support 241 of the outer circumference be longer than the support 242 on an inner circumference. Likewise, if the support 241 is different in height from the support 242, they have different elastic transformation rates, when the blade 230 moves in a focusing direction (F). Therefore, rolling occurs such that the posture of the blade 230 is changed, at a predetermined angle. Likewise, Korean Patent Publication No. 2003-69459 discloses an operation of the response of the supports with respect to a deflected optical disc by making the length of supports 241, 242 different, therefore the detailed description will be omitted. That is, as described in FIG. 2A and FIG. 2B, the actuator causes rolling of the blade 230 in a direction of (+) or (−) according to a deflection degree of the disc.

The magnetic driving part 250 is for driving the object lenses 110, 120 in a focusing (F) direction and a track (T) direction. The magnetic driving part 250 includes a first and a second focusing coils 251, 252, a pair of track coil 253, and first and second polarized magnets 254, 255.

The first and second focusing coils 251, 252 are installed at an inner side of the blade 230 and wrapped in a substantial rectangular pattern with reference to each focusing coil 251, 252.

By interactions between sides parallel to a T direction, that is, a pair of short sides, and the first and second polarized magnets 254, 255, the first and the second focusing coils 251, 252 drive the blade 230 in a focusing direction.

The track coils 253 are installed parallel to a T direction of the blade 230. Each of the track coils 253 is disposed in the center between the first and the second focusing coils 251, 252, in a T direction and corresponds to the center between N poles and S poles polarized in a T direction of respective polarized magnets 254, 255. Each track coil 253 is wrapped in a substantially rectangular pattern and sides parallel to a focusing direction of the track coils 253 face both N poles 254a, 255a and S poles 254b, 255b (facing each other respectively) of the polarized magnets 254, 255. The track coils 253 drive the blade 230 in a track (T) direction by interactions between the first and second polarized magnets 254, 255.

Each of the first and second polarized magnets 254, 255 is disposed at a predetermined distance from an outer side parallel to a T direction of the blade 230, with the blade 230 in the center.

Each polarized magnet 254, 255 has N poles and S poles polarized in a T direction.

The first and second polarized magnets 254, 255, as above structured, interact with the first and second focusing coils 251, 252 and with each track coil 253. That is, each polarized magnet 254, 255 is involved in driving the blade 230 in a focusing and tracking direction and further in a rolling (R) direction. Each other corresponding part of the first and second polarized magnets 251, 252, that is, parts facing each other, are disposed to have the same polarity The magnetic driving part 250 further includes two pairs of inner yokes 257, 258 disposed at inner sides of the first and second focusing coil 251, 252, and outer yokes 256 corresponding to the first and second polarized magnet 254, 255, respectively.

The inner yokes 257, 258 are disposed within focusing coils 251, 252 and are parallel to a T direction, and to the active coil parts of each of the focusing coils 251, 252. The inner yokes 257, 258 are fixed at the base 210 or can be made of uniform materials and formed in a single body. Not in contact with the focusing coils 251, 252, the inner yokes 257, 258 guide a line of magnetic force generated in a focusing direction at the focusing coils 251, 252, to maximize the strength of an effective magnetic field.

The outer yokes 256 are fixed at the base 210 and may be formed in a single body with the base 210. The outer yokes 256 are disposed in a direction not facing the blade 230 of each of the first and second polarized magnets 254, 255. The outer yokes 256 support each of the first and second polarized magnets 254, 255.

The outer yokes 256 guide a line of magnetic force of a magnetic field generated at each of polarized magnets 254, 255 and converge towards the blade 230, to maximize the strength of an effective magnetic field.

The magnetic driving part 250 is driven by Fleming's rule. Therefore a detailed description of the operation of the magnetic driving part will be omitted. However, Korean Patent Publication No. 2004-38118 describes such operation in detail.

The pick-up base 300 supports the actuator 200. The pick-up base 300 includes a light source (not shown), an optical unit guiding a light projected from the light source to the object lens, and an optical detecting part converging the returning light, reflected from an optical disc (D) after converging at the object lenses 110, 120. Since the above light source, optical unit and optical detecting part can be understood from the well known technology, drawings and detailed description will be omitted.

Referring to FIG. 6, the pick-up base 300 reciprocates in a radius direction of the disc (D) by a driving unit (not shown) and whose one end is connected to a guide shaft 400 and guided, to this end. The pick-up base 300 is provided with supporting parts 310, 320, 330 corresponding to the combining parts 211, 213 to be combined with the base 210 of the actuator 200 by a solder 340 or an adhesive. In an embodiment of the present invention, the supporting part 330 is disposed to combine with the outer yoke 256 of the actuator 300.

In an embodiment of the present invention, the actuator 200, as illustrated in FIG. 6, is installed at a predetermined angle (−θ) with respect to the pick-up base 300. Accordingly, the blade 230 is disposed at a predetermined angle (−θ) with respect to the pick-up base 300. As a result, considering that the pick-up base 300 should naturally be installed parallel to the optical disc (D), the actuator 200, more specifically, the blade 230 and the object lenses 110, 120 are installed to form a predetermined angle (−θ) with respect to the optical disc as an initial posture (position).

The blade 230 is disposed to have negative (-) rolling with respect to a reference axis (X) parallel to the optical disc (D). Accordingly, the closer to the outer side of the optical disc (D), the farther the blade 230 is set from the optical disc (D).

As mentioned above, there are different distances OD1, OD2 between the object lenses 110,120, that is, a kinematic neutral position (hereinafter, referred to an initial position) and an optical disc (D). Each of the object lenses 110,120 is disposed at the initial position in order to make each of driving distances consistent in an error range. Each of the driving distances (OD1 -WD1) (OD2-WD2) refers to a position of focusing on each object lens 110, 120 on a predetermined type of optical disc from the initial position, that is, a position of obtaining working distances WD1, WD2, (hereinafter, referred to focusing-on position) electrically maintaining the neutrality. To this end, the actuator 200 is set to be tilted and at that time, the gradient is obtained by calculating the rolling position of the blade 230 at zero degrees, that is, parallel to the optical disc (D), when moving the blade 230 in a focus (F) direction by the working distance (OD1-WD1)(OD2-WD2).

The error range may vary according to four directions of each of the object lenses 110, 120 and concrete examples will be described later.

The object lenses 110,120 are disposed to be consistent in a direction when moving from the initial position to the focusing-on position. More specifically, the object lenses 110, 120 are disposed farther in distance between the initial position and the optical disc (D) than the working distance.

If the plurality of object lenses 110,120 are employed, as described above, it is possible to use optical recording media of 3 or more recording densities.

Hereinafter, there will be described an operation for recording and/or reproducing information from/to the media having different recording densities, e.g., BD, HD-DVD and DVD, by selectively using the first and the second object lenses 110,120. For example, the first object lens 110 is for BD and the second object lens 120 is for HD-DVD and DVD.

[Diagram 1]

| Classification | The first object lens | The second object lens | |
|---|---|---|---|
| | BD | HD-DVD | DVD |
| Initial position (OD) | 0.75 mm | 1.15 mm | 1.15 mm |
| Working distance (WD) | 0.55 mm | 0.93 mm | 0.97 mm |
| Operating distance (OD – WD) | +0.20 mm | +0.22 mm | +0.18 mm |

In case of using 3 optical recording media (BD, HD-DVD, DVD), as illustrated in Table 1, the first and the second object lenses 110,120 are disposed to be consistent in the driving distance from the initial position (OD) to the working distance, within a substantial error range.

While an aspect of the invention has been shown and described with reference to certain embodiments thereof, it will be understood by those skilled in the art that various changes in form and details may be made therein without departing from the spirit and scope of the invention as defined by the appended claims. ±0.02 mm of error range is exemplified for description. Since rolling of the blade 230 is substantially very small within the error range, it may not be taken into consideration.

There will be described the operation of recording and or reproducing information to/from each recording medium, with the object lenses 110,120 set, based on standards in Table 1.

Figure 7A:
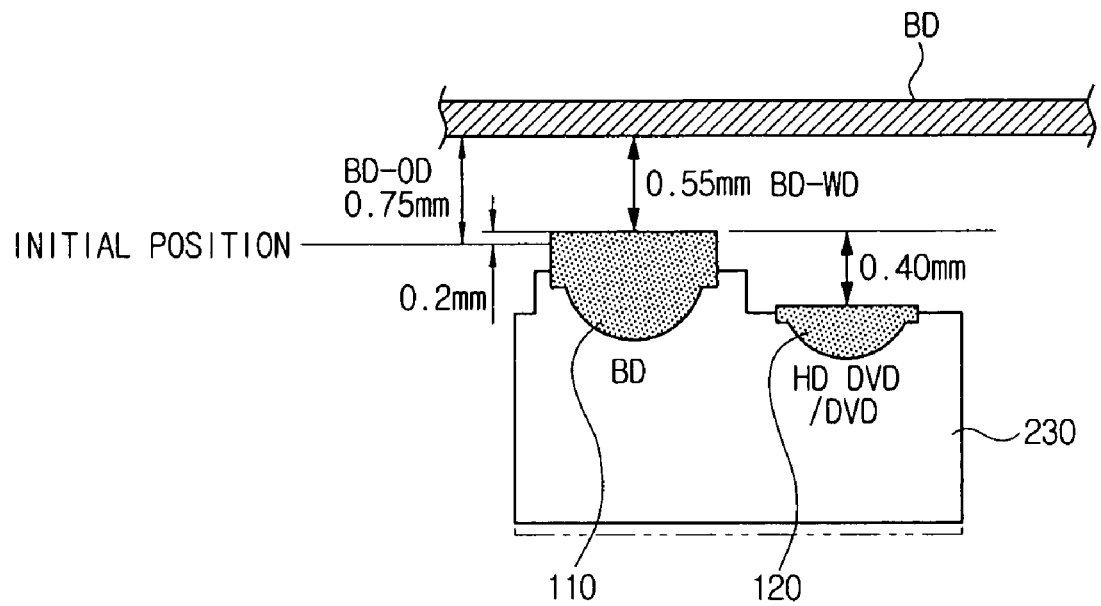
FIG. 7A is a schematic view showing that the blade is moved to focusing-on position of the BD.

FIG. 7A is provided to explain a case of employment of BD as an optical recording medium. FIG. 7A is a view illustrating that the first object lens 110 rises by the driving distance from the initial position (BD-OD) to the driving distance, that is, 0.20 mm, and is located on the focusing-on position.

In the initial position (BD-OD), the first object lens 110, as illustrated in FIG. 6, is rolled at a predetermined angle (-θ) and at this state, if the actuator 200 is driven in a focusing direction to locate the first object lens 110 on the focusing-on position of maintaining the working distance (DB-WD), a support on an outer circumference is shaped and the blade 230 is moved to the focusing-on position. In a focusing-on position, rolling of the blade 230 is zero, that is, the blade 230 is in a horizontal state with BD. At this state, BD rotates and information recording and or reproduction are performed through focusing operations at the first object lens 110. In order to cope with the shaking of BD caused by BD deflection, a posture of the BD is adjusted by rolling motions caused by rigidity differences between the inner and outer supports 241, 242 when the blade 230 ascends and descends in a focusing direction. Accordingly, the focusing position with respect to a recording surface of BD is possibly traced.

Figure 7B:
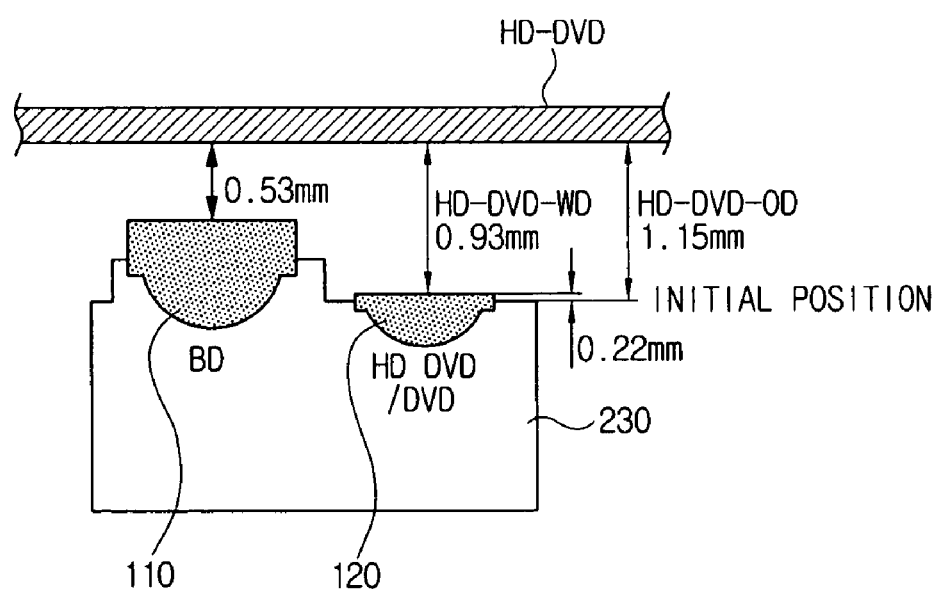
FIG. 7B is a schematic view showing that the blade is moved to focusing-on position of the HD-DVD.

As illustrated in FIG. 7B, in case of recording or reproducing information from an HD-DVD using the second object lens 120, the actuator 200 is driven to move, such that the second object lens 120 maintains the working distance (HD-DVD-WD), that is, 0.93 mm. In this case, the second object lens 120 rises 0.22 mm of driving distance (OD-WD) from the initial position (OD) and therefore, rolling is zero, at a horizontal state. That is, since the blade is raised in the same height within the error range, as described in FIG. 7A, the second object lens 120 can maintain its stable posture without substantial rolling on a focusing-on position. The second object lens, which moved to the focusing-on position, is driven to rise properly according to a deflection in rotation of the HD-DVD, such that positive (+) rolling and negative (-) rolling are normally performed. Although the second object lens 120 is moved to the focusing-on position, the first object lens 110 is substantially 53 mm away from the HD-DVD, maintaining distances safe enough not to cause any possible collision against the HD-DVD in rolling of the blade 230.

Figure 7C:
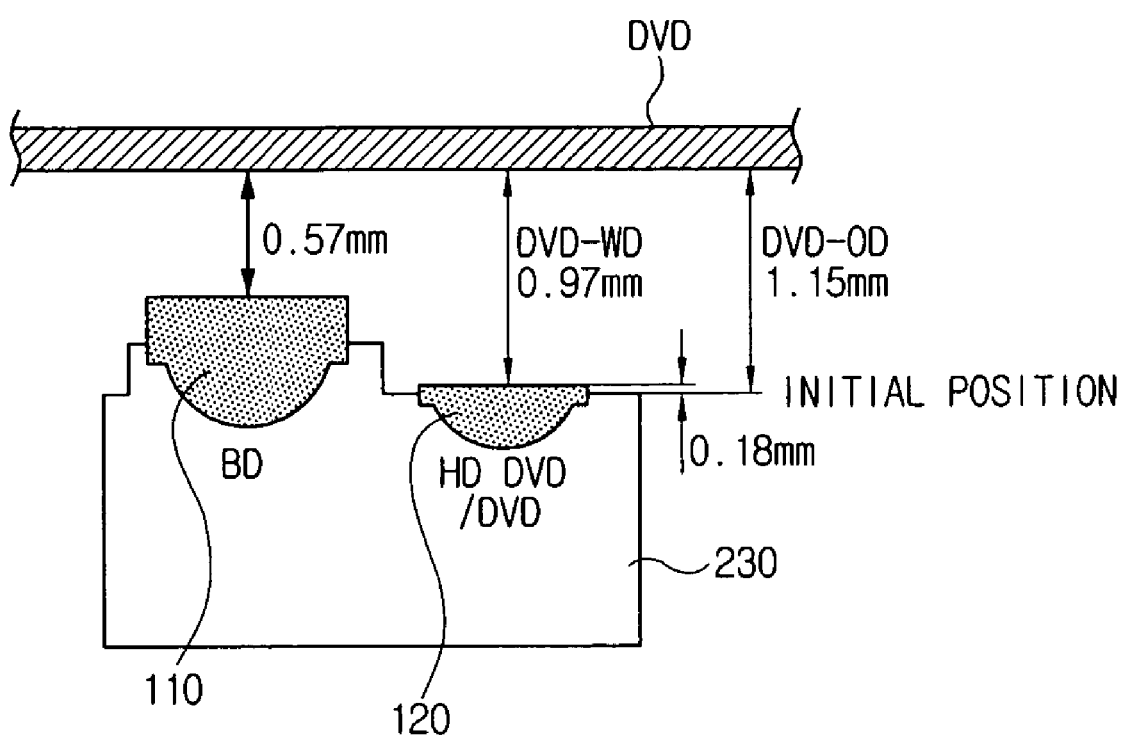
FIG. 7C is a schematic view showing that the blade is moved to focusing-on position of the DVD.

FIG. 7C is a view provided to explain recording and/or reproducing information from a DVD using the second object lens 120. In FIG. 7C, it is described that the second object lens 120 is moved to the focusing-on position maintaining 0.97 mm of working distance (DVD-WD) with the DVD. That is, the second object lens 120 rises by 0.18 mm from the initial position DVD-OD away 1.15 mm from the DVD. In this case, the second object lens, that is, the blade 230, rises within an allowable error range, and the second object lens 120 has zero rolling state, thus staying parallel to the DVD. At this state, when recording and or reproducing information from the DVD, the blade rises and falls, to roll, corresponding to the DVD deflection.

As described above, the actuator 200 is formed at a predetermined angle with respect to the pick-up base 300, such that each object lens 110, 120 obtains the consistent driving distance to move and maintain the working distance with respect to corresponding recording media. Accordingly, although several optical recording media having different working distances are used, the blade 230 is controlled not to roll, maintaining the working distance with each optical recording medium. This way, when recording and/or reproducing information from an optical recording medium, it is possible to accurately and stably control rolling motions of the blade obtaining the working distance by the deflection of an optical recording medium.

The process of installing the actuator 200 to the pick-up base 300 at a predetermined angle will be described, as follows.

As illustrated in FIG. 6, the pick-up base 300 is fixed on a predetermined supporting stand. At this state, the actuator 200, clamped by a predetermined adjustment jig, is located at the pick-up base 300. With a cover glass on an upper side of the actuator 200, an observation microscope is located on the cover glass. At this state, the actuator is driven to move the blade by the driving distance. The posture of the actuator 200 is adjusted such that light projected at the light source passes through the object lenses mounted at the actuator 200 and an optical spot is formed at the observation microscope.

With the optical spot formed at the observation microscope and the posture of the actuator 200 fixed, the actuator 200 and the pick-up base 300 are combined. For example, as illustrated in FIG. 6, combining parts 211, 213 of the actuator 200 may be combined with supporting parts 310, 320 of the pick-up base 300 with soldering 340.

According to an embodiment of the present invention, HD-DVD and DVD are exemplified as an optical recording medium capable of recording and/or reproducing information using the second object lens 120, but the recording media is not limited to those recited in the specification. In a case that the second object lens 120 uses DVD and VD, the same effect as mentioned above may be obtained, by adjusting the distance between the first and second object lenses 110,120 and installing the actuator 200 at a predetermined angle with respect to the pick-up base 300. Since the measure of the distance between the first and second object lenses is obtained from an experiment according to features of each object lens, a detailed description will be omitted.

As described above, in the optical pickup for an optical recording and/or reproducing apparatus according to an embodiment of the present invention, an actuator is installed at a predetermined angle with respect to a pick-up base. Therefore, each of a plurality of object lenses may be moved a uniform distance when moved to a position for maintaining a working distance with respect to an optical recording medium. Accordingly, when employing optical recording media of different recording densities, the blade is normally operated, to trace the focusing position with respect to the recording surface of a particular type of optical recording medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup of an optical recording and/or reproducing apparatus, the optical pickup comprising:
   a plurality of object lenses used to record and/or reproduce information from/or various types of optical recording media of different recording densities;
   an actuator driving the object lenses in a focusing direction and supporting the object lenses to have rolling during movement in the focusing direction;
   and a pickup base installed to movably go and return in a radial direction of one of the optical recording media, and supporting the actuator,
   wherein the actuator forms a predetermined angle with respect to the pickup base,
   wherein the various types of optical recording media include a first optical recording medium, a second optical recording medium having less recording density than the first optical recording medium, and a third optical recording medium having less recording density than the second optical recording medium,
   wherein the plurality of object lenses comprise a first object lens corresponding to the first optical recording medium and a second object lens having less NA (Numerical Aperture) than that of the first object lens, corresponding to the second and third optical recording media,
   wherein the actuator comprises:
   a blade supporting the plurality of object lenses;
   a base frame being combined to the pick-up base;
   a support on both sides of an inner and outer circumference of the blade, the support connecting and supporting the blade on respective sides of the inner and outer circumferences, to the base frame in a radial direction of the optical recording media, and having different rigidities between both sides of the inner and outer circumferences; and
   a magnetic driving portion driving the blade in a focusing direction and/or track direction.

2. The optical pickup of claim 1, wherein a distance between the optical recording medium and the plurality of object lenses is longer than a distance between the optical recording medium and a focusing-on position of the plurality of object lenses.

3. The optical pickup of claim 2, wherein the plurality of object lenses are disposed at equal distance intervals, within a predetermined error range of a moving distance from an initial position to the focusing-on position.

4. The optical pickup of claim 3, wherein the error range is within ±0.2 mm.

5. The optical pickup of claim 1, wherein the actuator is further from an outer circumference of the optical recording medium than an inner circumference of the optical recording medium.

6. The optical pickup of claim 1, wherein the object lenses are disposed in a manner that a rolling degree of the object lenses reaches zero when one of the plurality of object lenses is moved to a focusing-on position with respect to the optical recording medium corresponding to the one object lens.

7. The optical pickup of claim 1, wherein the first object lens is disposed closer to an outer circumference of the optical recording media than the second object lens.

8. The optical pickup of claim 1, wherein the first optical recording medium is an optical recording medium of a BD type.

9. The optical pickup of claim 1, wherein the second optical recording medium is an optical recording medium of an HD-DVD type.

10. The optical pickup of claim 1, wherein differences in heights between the first and the second object lenses is 0.3 mm through 0.5 mm.

11. The optical pickup of claim 1, wherein the third recording medium is an optical recording medium of a DVD type.

12. The optical pickup of claim 1, wherein the second recording medium is an optical recording medium of a DVD type and the third recording medium is an optical recording medium of a CD type.

13. An optical pickup comprising:
   a plurality of object lenses having different numerical apertures;

an actuator supporting the plurality of object lenses; and a pick up base supporting the actuator, wherein the plurality of object lenses have different working distances and are installed in the actuator at different heights to read/and write information from/to various types of optical recording media, wherein the actuator further comprises a base mounted on the pick-up base, a holder placed at one end of the base, a blade supporting the plurality of object lenses, supports moving the blade with respect to the holder, and a magnetic driving unit moving the blade in a focusing and a tracking direction, wherein the supports located on an outer circumference of the blade have less rigidity than the supports located on an inner circumference of the blade.

14. The optical pickup of claim 13, wherein the actuator is formed at a predetermined angle with respect to the pick-up base, such that each of the plurality of object lenses maintains the working distances with respect to the various types of optical recording media.

15. The optical pickup of claim 13, wherein the working distance between the optical recording media and the plurality of object lenses is longer than a distance between the optical recording media and a focusing-on position of the plurality of object lenses.

16. The optical pickup of claim 13, wherein the base further comprises combination portions for attaching to the pick-up base.

17. The optical pickup of claim 13, wherein the magnetic driving unit includes focusing coils, tracking coils and polarized magnets moving the blade in the focusing and tracking directions.

18. The optical pickup of claim 17, wherein the blade is controlled to maintain the working distances with respect to the various types of optical recording media.

* * * * *